May 28, 1940. A. L. CLARK 2,201,984
HEATED AUTOMOBILE BLANKET
Filed Jan. 19, 1939
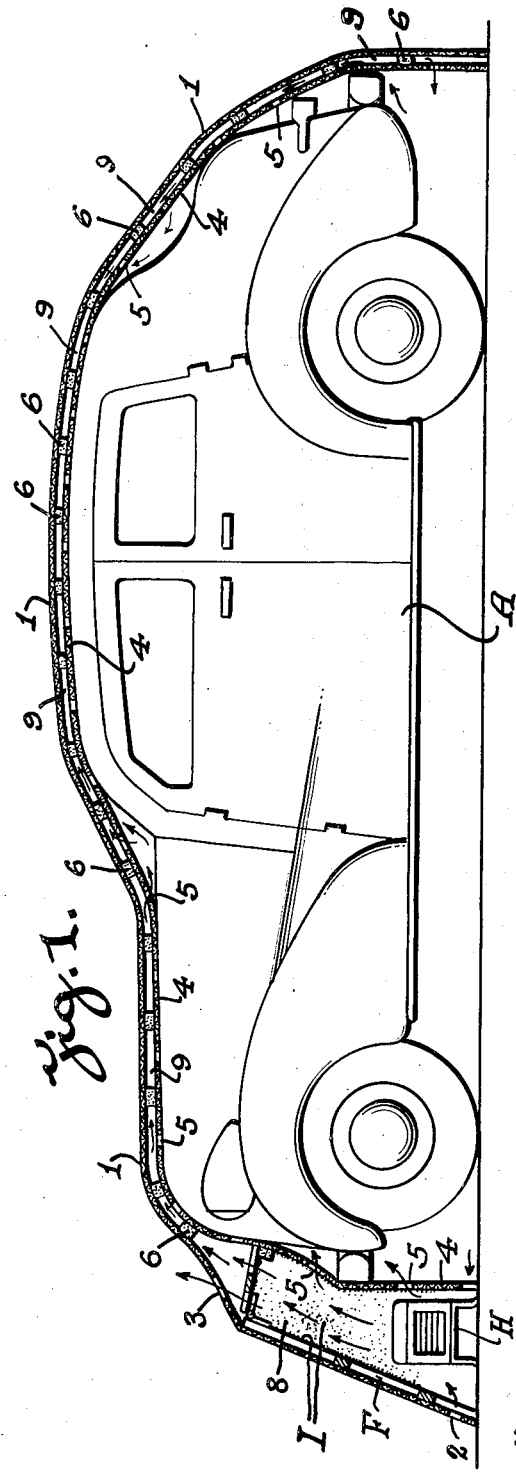
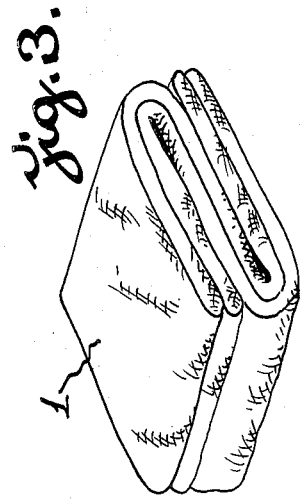
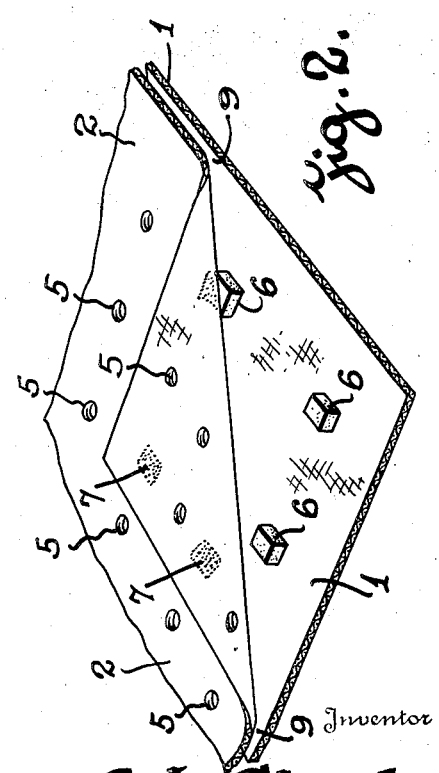
Inventor
A. L. Clark
By Lester Sargent
Attorney Patented May 28, 1940

2,201,984

UNITED STATES PATENT OFFICE 2,201,984

HEATED AUTOMOBILE BLANKET

Augustus L. Clark, Montpelier, Vt.

Application January 19, 1939, Serial No. 251,865

4 Claims. (Cl. 135—1)

The object of my invention is to provide a novel heated automobile blanket to keep the radiator of an automobile from freezing when it is standing in a cold garage or exposed to outdoor weather; and to provide a blanket of novel type for this purpose and also to provide means for heating it and for supporting the blanket adjacent said supporting means.

I attain these and other objects of my invention by the device illustrated in the accompanying drawing, in which—

Figure 1 is a side elevation of an automobile to which my invention is applied, the blanket being shown in longitudinal section;

Fig. 2 is a perspective view of a portion of the blanket; and

Fig. 3 is a perspective view of the blanket folded up.

Like numerals designate like parts in each of the several views.

Referring to the accompanying drawing, I provide a blanket which entirely covers the automobile A, as shown in Fig. 1. This blanket consists of an outer fabric member 1, an inner fabric member 4, said members being spaced apart by pieces of felt 6, which are about 1" thick. The inner blanket 4 has a multiplicity of openings 5, preferably one inch in diameter and preferably spaced about two feet apart in the inner blanket to aid in the circulation of heated air. At the front the blanket is supported in a substantially spaced relation to the inner blanket by the foldable frame F. An open space 9 is provided between the outer blanket 1 and the inner blanket 4 by reason of the distribution of the spacing felt blocks 6.

The heated air 8 generated by the heater H, which may be a gas, oil or electric stove follows the path of the arrows, as shown in Fig. 1 and circulates from the chamber 8 into the space 9 between the blankets 1 and 4. The chamber 9 is formed by reason of the supporting frame F which holds the outer blanket 1 away from the heater H and also substantially away from the inner blanket 4. Frame F is sheeted with asbestos I.

I may provide a suitable vent 3 in the outer blanket for the escape of fumes from the heater of an oil or gas stove, if such types of stoves are used; and also provide an inlet vent 2 near the bottom of the outer blanket to admit air for purposes of combustion to the heater H.

The operation of my invention will be apparent on examining Figure 1 of the drawing.

The device provides a means by which persons who cannot afford a garage can readily keep their car in good condition and prevent freezing of the radiator or condensation of water into the oil or gas. The device also provides a means by which the amount of fuel required to do the heating is kept at a minimum.

What I claim is:

1. In a heated automobile blanket, the combination of an inner blanket of suitable size to extend entirely over the automobile and reach the ground, said inner blanket having a multiplicity of apertures therein, an outer blanket of substantially the same size, spaced pieces of felt mounted between the outer and inner blankets to support same in a closely spaced relation and to permit heated air to circulate between the blankets and through the apertures of the inner blanket to the automobile.

2. In a heated automobile blanket, the combination of an inner blanket of suitable size to extend entirely over the automobile and reach the ground, said inner blanket having a multiplicity of apertures therein, an outer blanket of substantially the same size, spaced pieces of felt mounted between the outer and inner blankets to support same in a closely spaced relation and to permit heated air to circulate between the blankets and through apertures of the inner blanket to the automobile, and a foldable supporting frame for holding the outer blanket in spaced relation to the inner blanket to provide room for a heater, said frame being sheeted with asbestos.

3. In a heated automobile blanket, the combination of an inner blanket of suitable size to extend entirely over an automobile and reach the ground, said inner blanket having a multiplicity of apertures therein for circulation of heated air from between inner and outer blankets to the automobile, an outer blanket of substantially the same size, spaced pieces of felt mounted between the outer and inner blankets to support same and spaced only sufficiently to permit heated air to circulate between the blankets and through apertures of the inner blanket to the automobile, a foldable supporting frame for holding the outer blanket in spaced relation to the inner blanket to provide a chamber for a heater, said frame being sheeted with asbestos, the outer blanket having a vent above the aforesaid chamber for a heater for the escape of fumes.

4. In a heated automobile blanket completely covering an automobile to protect it from the weather, said blanket comprising spaced blanket members, a series of spacing elements holding said blankets in closely spaced relation, the inner blanket having perforations for the passage of heated air from between the blankets to the automobile and a heating chamber formed between the blankets and adapted to contain a heating means for supplying heat between said blankets to prevent the automobile radiator and the lubrication of the automobile from freezing.

AUGUSTUS L. CLARK.